(12) United States Patent
Kim

(10) Patent No.: US 9,042,238 B1
(45) Date of Patent: May 26, 2015

(54) LINK MONITORING

(75) Inventor: Kyungho Kim, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 916 days.

(21) Appl. No.: 12/552,943

(22) Filed: Sep. 2, 2009

Related U.S. Application Data

(60) Provisional application No. 61/097,027, filed on Sep. 15, 2008.

(51) Int. Cl.
*G06F 13/372* (2006.01)
*H04W 76/04* (2009.01)

(52) U.S. Cl.
CPC .................................. *H04W 76/041* (2013.01)

(58) Field of Classification Search
CPC .......... H04W 76/048; H04W 52/0216; H04W 68/02
USPC ................ 370/252, 503, 236, 311, 335, 328; 714/749
See application file for complete search history.

(56) References Cited

U.S. PATENT DOCUMENTS

| | | | | |
|---|---|---|---|---|
| 7,864,724 | B2 * | 1/2011 | Kaikkonen et al. | 370/318 |
| 2004/0029596 | A1 * | 2/2004 | Kim et al. | 455/458 |
| 2007/0286080 | A1 * | 12/2007 | Kim et al. | 370/236 |
| 2007/0291673 | A1 * | 12/2007 | Demirhan et al. | 370/311 |
| 2008/0008212 | A1 * | 1/2008 | Wang et al. | 370/503 |

* cited by examiner

*Primary Examiner* — Jamal Javaid

(57) ABSTRACT

Embodiments of the disclosure provide systems, methods, apparatuses, and/or articles of manufacture that may monitor a link of a wireless communication network for a period of time during a plurality of active periods of a DRX cycle, generating synchronization signals during the plurality of active periods, and determining a quality of the link based on the synchronization signals.

22 Claims, 3 Drawing Sheets

LINK MONITORING

CROSS REFERENCE TO RELATED APPLICATIONS

The present application claims priority to U.S. Provisional Patent Application No. 61/097,027, filed Sep. 15, 2008, the entire disclosure of which is hereby incorporated by reference except for those sections, if any, that are inconsistent with this specification.

TECHNICAL FIELD

Embodiments herein relate to the field of radio link monitoring in telecommunication networks, and, more specifically, to radio link monitoring during discontinuous reception.

BACKGROUND

The Third generation partnership project (3GPP) includes specifications for radio link monitoring. These specifications may involve monitoring a link for a specified period of time for averaging purposes. For example, a specification may require a radio access link to be monitored continuously for two hundred milliseconds in order to more accurately determine the link quality. During these periods of time, a physical layer reports synchronization signals associated with received frames to a controller in an upper layer, for example, a radio resource controller ("RRC"). Based on the received signals, the RRC determines whether the current communication link is stable. Stability or instability may be determined, via one or more filters, by receipt of successive in-synch signals or successive out-of-synch signals. While such specifications may accurately define a quality of a radio link during continuous reception modes, the specifications fail to account for discontinuous reception modes.

Discontinuous reception ("DRX") modes enable a mobile device to enter a sleep state and wake periodically to listen for paging messages. The sleep states may be negotiated, in combination with the connection details, when a mobile device or user equipment connects to a network. When operating in DRX mode, radio link monitoring according to current specifications may be ineffective because measurements cannot be done during the length of time the UE is in sleep mode, referred to as the DRX period. This effectively reduces the actual measurement duration and may result in a less averaged measurement. Consequently, in DRX mode, current specifications for radio link monitoring may result in measurements that fluctuate faster than necessary resulting in temporary glitches or short-term variations being reported to the RRC. These temporary glitches may result in the RRC having to react unnecessarily and result in inaccurate status reports.

SUMMARY

Embodiments of the disclosure include methods of monitoring a link of a wireless communication for a period of time during a plurality of active periods of a discontinuous reception cycle. During the plurality of active periods of the discontinuous reception cycle, synchronization signals that correspond to the status of the link may be generated. These synchronization signals may then be used to determine a quality of the link.

Articles of manufacture, according to embodiments, may include a plurality of programming instructions stored on a computer-readable medium that, when executed, enable a node within a wireless communication network to monitor a link of the wireless communication network for a period of time during a plurality of active periods of a discontinuous reception cycle, generate synchronization signals that correspond to the status of the link, during the plurality of active periods, and determine a quality of the link based on the synchronization signals.

An apparatus, according to various embodiments, may include a transceiver configured to monitor one or more links of a wireless communication network for a period of time during active periods of a discontinuous reception cycle. The apparatus may further include a synchronizer, coupled to the transceiver, that is configured to generate synchronization signals during the plurality of active periods. The synchronization signals may correspond to the status of the one or more wireless links. The apparatus may also include a controller, coupled to the synchronizer, and configured to determine a quality of the one or more links based on the synchronization signals.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent or that each discrete operation is required for all embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

The description may use the terms "embodiment" or "embodiments," which may each refer to one or more of the same or different embodiments. Furthermore, the terms "comprising," "including," "having," and the like, as used with respect to embodiments, are synonymous.

In various embodiments, methods, apparatuses, articles of manufacture, and systems for radio link monitoring during discontinuous reception are provided. In exemplary embodiments, a computing system may include with one or more components of the disclosed apparatuses and/or systems and may be employed to perform one or more methods as disclosed herein.

Figure 1:
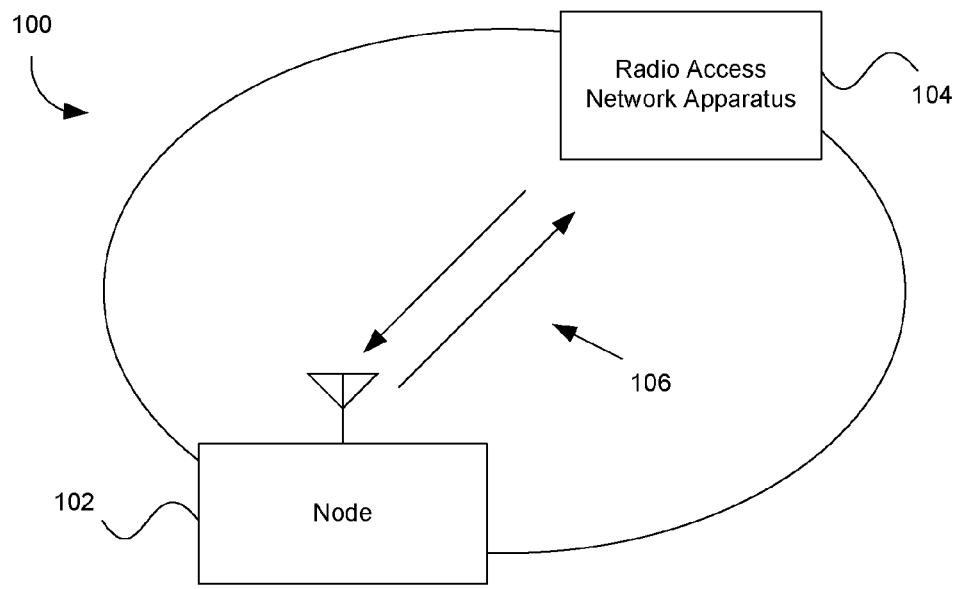
FIG. 1 illustrates a mobile communication system.

FIG. 1 illustrates a wireless communication network (100) including a node (102) and a radio access network apparatus (104). In the wireless communication network 100, the radio access network apparatuses (104) generate a radio zone, which is generally referred to as a cell. In the cell, the radio access network apparatus (104) is communicatively coupled to the node (102). In this type of system, when the node (102) is powered on, synchronization between the node (102) and the radio access network apparatus (104) is established. During synchronization, the node (102) and the radio access network apparatus (104) determine a discontinuous reception cycle for the node (102). The discontinuous reception cycle enables the node (102) to power down for known periods of time. If the node (102) moves from one cell to another, synchronization with another radio access network apparatus in the latter cell is established. After synchronization, the node (102) can enter a standby status and perform discontinuous reception.

As shown in FIG. 1, the node (102) and the radio access network apparatus (104) can perform wireless communication with each other using a shared link (106). While two links are illustrated, the node (102) and the radio access network apparatus (104) can communicate using more or fewer links. The wireless communication network (100) can operate in accordance with a 3GPP specification. As used herein, a 3GPP specification refers to any of a number of specifications, including, but not limited to, GSM (Global System for Mobile Communications), W-CDMA (Wideband Code Division Multiple Access), and LTE (Long Term Evolution) specifications, as adopted, proposed, or propagated by the 3$^{rd}$ Generation Partnership Project.

In various embodiments, the node (102) determines a quality of the link (106) while operating in a discontinuous reception mode. Node (102) monitors a link of the wireless communication network (100) for a period of time, during which the node (102) alternates between active states and sleep states according to a discontinuous reception cycle. When the node (102) is in an active state during the period of time, the node (102) generates synchronization signals that correspond to a status of the link based on one or more received frames. The synchronization signals indicate link stability or link instability. Generally, the node (102) generates one synchronization signal for each received frame; however, more or fewer synchronization signals can be generated for a plurality of frames dependent upon, for example, the amount of averaging required by node (102). Based on the synchronization signals, for example, the number of consecutively received synchronization signals, the node (102) determines the link quality.

Figure 2:
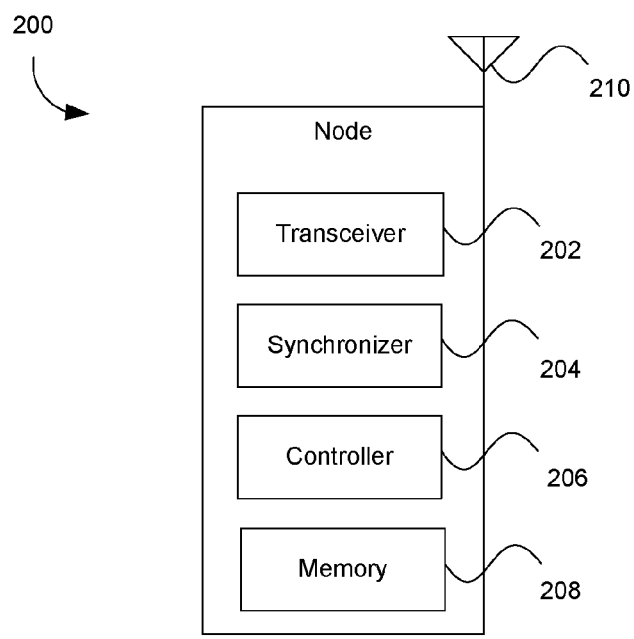
FIG. 2 illustrates a functional block diagram of node.

FIG. 2 illustrates a functional block diagram of a node (200), in accordance with various embodiments. The node (200) includes a transceiver (202), a synchronizer (204), a controller (206), a memory (208), and one or more antennas (210). Node (200) may include additional components known in the art without deviating from the scope of this disclosure.

Node (200) may be any type of wireless or mobile device that can connect with a network. For example, node (200) can be a mobile device, an access point, or a base station. Node (200) can be a 3G mobile telecommunication system capable of operating in both a continuous reception mode and a discontinuous reception mode, for example, a mobile phone. In various embodiments, the node (200) monitors radio link quality while operating in a discontinuous reception mode. As will be discussed in further detail herein, the node (200) operates in a discontinuous reception mode having a known discontinuous reception cycle. That is, the amount of time the node (200) operates in an active state and a sleep state is resolved. A discontinuous reception cycle can be determined based on a number of factors such as battery life, utilization, or alternatively, may be chosen from one of a plurality of predefined cycles.

In various embodiments, the transceiver (202) receives and/or transmits management and control traffic, in addition to communication packets. The transceiver (202) may be a single communication interface capable of both transmitting and receiving. Alternatively, the node (200) may utilize a transmitter and a receiver to perform similar functions.

The transceiver (202) generally is configured to monitor one or more links of a wireless communication network during active periods of a discontinuous reception cycle over a period of time. The transceiver (202) receives signals from antenna (210) and delivers them to various other elements of the node (200) to facilitate a link quality determination. Additionally, transceiver (202) is capable of outputting signals to the antenna (210) for wireless transmission across the wireless network. From a perspective of a communications protocol framework, the transceiver (202) can be seen as a portion of Layer 1, the physical layer. The transceiver (202), in various embodiments, is configured to discontinuously or continuously receive signals via an antenna (210).

The antenna (210) is coupled to the transceiver (202), and can comprise one or more direction or omni-directional antennas including, for example, dipole antennas, monopole antennas, patch antennas, loop antennas, microstrip antennas, or other types of antennas suitable for transmission of radio frequency signals. While FIG. 2 depicts only one antenna, the node (200) may include a plurality of antennas.

The synchronizer (204) is part of a physical layer and coupled to the transceiver (202). Among other things, the synchronizer (204) generates synchronization signals during active periods of the node (200). In various embodiments, the synchronization signals correspond to a status of a link between the node (200) and another node and indicate the links stability based upon an in-synch synchronization signal, or alternatively, an out-of-synch synchronization signal. In various embodiments, the synchronization signals are determined based upon a received signal from the transceiver (202). The received signal includes a signal-to-noise ratio ("SNR") that is compared with threshold values predefined for the node (200). Based on whether the SNR is high or low compared to one or more thresholds, the synchronizer generates an appropriate synchronization signal.

In various embodiments, the synchronizer (204) is coupled to a controller (206). The controller (206), in various embodiments, can be a radio resource controller ("RRC") and can include one or more counters or filters. The controller (206) can be realized in Layer three, as will be discussed further herein. The controller (206) selectively turns on and off the transceiver to discontinuously transmit and/or receive based on various configuration parameters. For example, the controller (206) can be configured to determine a period of time to operate in a discontinuous mode based on various criteria, for example on remaining battery life. Additionally, the controller (206) can be configured to determine a quality of a link based on the synchronization signals generated by the synchronizer (204).

In various embodiments, controller (206) is coupled to memory (208). Memory (208) can include volatile and/or non-volatile memory. Volatile memory may be implemented by Synchronous Dynamic Random Access Memory (SDRAM), Dynamic Random Access Memory (DRAM), RAMBUS Dynamic Random Access Memory (RDRAM), and/or any other type of random access memory device. Non-volatile memory may be implemented using flash memory, Read Only Memory (ROM), Electrically Erasable Programmable Read Only Memory (EEPROM), and/or any other desired type of memory device.

Figure 5:
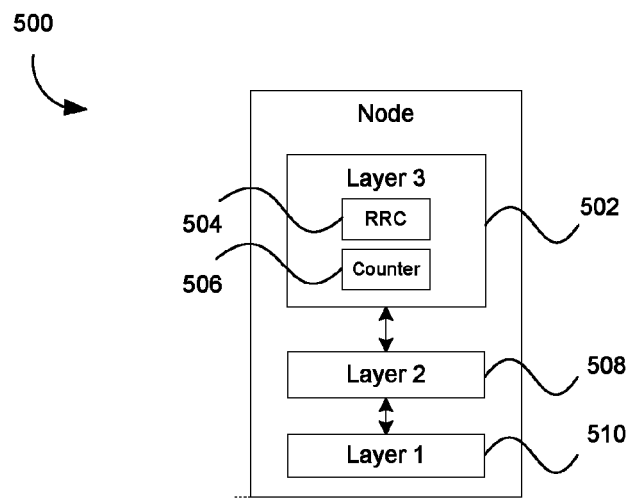
FIG. 5 illustrates a block diagram of a protocol stack.

Referring to FIG. 5, a block diagram of node (500) from a communications protocol framework is illustrated. The node (500) includes a Layer three (502), a Layer two (508), and a Layer one (510). The node (500) may include other Layers—e.g., such as an Application Layer (not shown) Layer three (502) generally includes a radio resource control ("RRC") entity (504) and one or more counters (506). The RRC (504) controls Layer one (510) and Layer two (508) and may perform peer-to-peer RRC communication with other communications devices, for example other nodes, base stations, access points or radio access network apparatuses. Layer two (508) includes a radio control link layer and a media access control layer, and Layer one (510) is a physical layer.

In the 3GPP specification, Layer three (502) includes filters to detect a quality of a radio link. For example, during a period of time, a filter or counter (506) may define a maximum number of successive out-of-synch signals, after receipt of which, the node may declare radio link failure. Alternatively, a filter may define a maximum number of successive in-synch signals, after which, the node may declare the link is in good condition. By determining and setting a proper period of time for measurement and proper values for counters, effective averaging can be accomplished while operating in a DRX mode.

In various embodiments, Layer three (502) utilizes the one or more counters (506) to detect radio link quality. For example, a counter (506) (e.g., N313) can be used for tracking a number of successive out-of-synch signals. When a counter reaches a predetermined number, the RRC (504) can determine that the link is unstable and updates a status of the link as a link failure. Additionally, another counter (e.g., N315) can be used to track a number of successive in-synch signals. Upon the RRC (504) determining that a number of consecutive in-synch signals have been received, the status of the link can be determined as being in good condition. In various embodiments, the number of consecutive in-synch or out-of-synch signals varies depending upon, for example, the length of the discontinuous reception cycle. If the discontinuous reception cycle is short, the number of consecutive in-synch or out-of-synch signals required to define the status of the link may be increased. This may account for the discontinuous period of the node.

In various embodiments, the number of successive in-synch or successive out-of-synch signals required to determine the quality of a link is predetermined and stored in the memory (208). In other embodiments, a period of time in which a transceiver is to monitor the link may also be predetermined and stored in the memory (208).

In various embodiments, the number of synchronization signals required to determine a quality of a link is modified to accommodate varying DRX cycles. For example, with reference to FIG. 3, a data structure (300) including DRX cycle coefficients (302) and counter information (304, 306) is illustrated. In one embodiment, a node may be required to monitor a radio link for a specified period of time. The specified period of time can be determined by one or more wireless specifications, for example, the two hundred milliseconds currently dictated by 3GPP. While monitoring the link, a node can determine a corresponding DRX cycle coefficient (302) as, for example, X1 (314). In this embodiment, the node utilizes values Y1 (316) and Z1 (318), as counter coefficients for counters N313 (304) and N315 (306), respectively. These values account for the DRX cycle of the node and facilitate a quality determination of the monitored link. In various embodiments, the values for the data structure (300) may be determined through one or more simulations or field tests.

Figure 4:
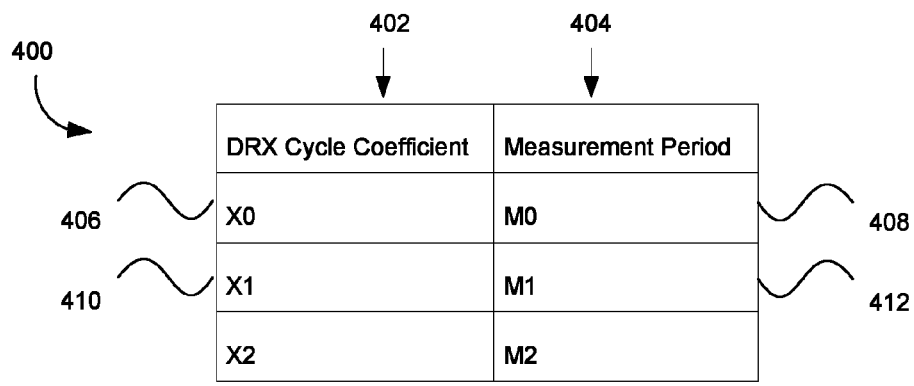

Referring to FIG. 4, another data structure (400) is illustrated for use in various embodiments. Currently, 3GPP specifies that a link is either stable or unstable based upon a predetermined number of successively received synchronization signals. In various embodiments, a node determines that the node is utilizing a DRX cycle having a DRX cycle coefficient X1 (410). The node can access the data structure (400) and determine that a corresponding measurement period for the DRX cycle coefficient is M1 (412). In various embodiments, M1 (412) may be longer or shorter than a currently utilized measurement period specified in the 3GPP specification. The data structure (400) stores measurement periods (404), which dictate a length of time the node is to monitor the link in order to successfully determine its quality. The period of time is determined such that the sum of the active periods of the DRX cycle is substantially equivalent to a monitoring time specified in the 3GPP specification (e.g., 200 ms). These measurement periods account for the DRX cycle of the node and facilitate a quality determination of the monitored link. In various embodiments, the measurement periods for a corresponding DRX cycle coefficient are determined through one or more simulations or field tests.

As an example, to monitor a quality of a link during a discontinuous reception mode, the node (200), operating with a known discontinuous reception cycle, monitors a link of the wireless communication network via the transceiver (202) and the antenna (210) for a period of time during a plurality of active periods of the discontinuous reception cycle. The period of time is determined based on the discontinuous reception cycle to more accurately determine link quality. Based on the monitoring, the synchronizer (204) generates synchronization signals which correspond to the status of the link while in an active mode of the discontinuous reception cycle. The synchronizer (204) then transmits the synchronization signals to the controller (206), which determines the quality of the link. In one embodiment, the controller (206) determines the quality of the link based upon a number of successive synchronization signals. The number of successive synchronization signals required to accurately define the quality of a radio link is determined for each discontinuous cycle.

Figure 6:
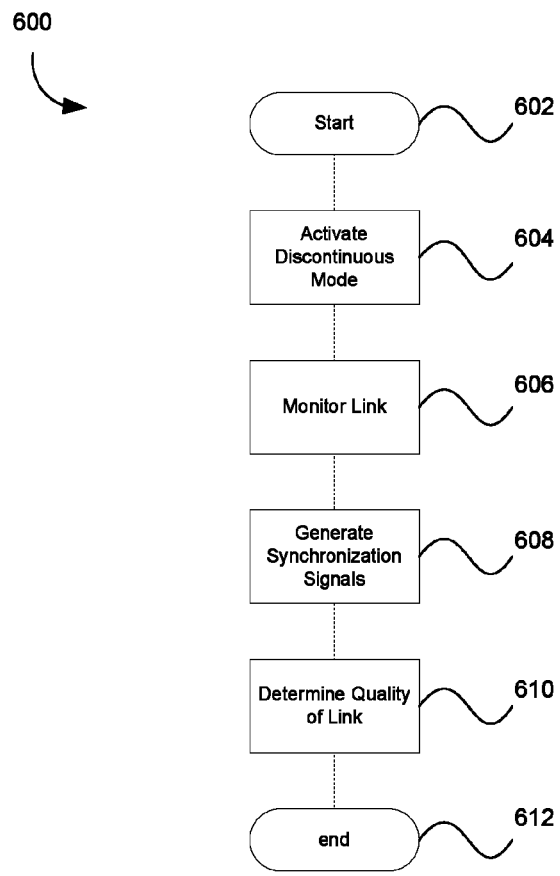
FIG. 6 illustrates a flowchart showing an operating example of a node.

Referring to FIG. 6, a method of determining a link quality is illustrated in accordance with various embodiments. The example process (600) of FIG. 6, respectively, may be implemented as machine-accessible or computer-readable instructions utilizing any of many different programming codes stored on any combination of computer-readable mediums such as, but not limited to, a volatile or nonvolatile memory or other mass storage device (e.g., a floppy disk, a CD, and a DVD). For example, the computer-readable instructions may be embodied in a computer-readable medium such as a programmable gate array, an application specific integrated circuit (ASIC), an erasable programmable read only memory (EPROM), a read only memory (ROM), a random access memory (RAM), a magnetic media, an optical media, and/or any other suitable type of medium.

Further, although a particular order of actions is illustrated in FIG. 6, one or more actions may be performed in other temporal sequences or concurrently. Again, the example processes (600) are merely provided and described in conjunction with the apparatus of FIGS. 2 and 5 as an example of one way for a node operating in a discontinuous reception cycle to determine a quality of a link. The methods and apparatus described herein are not limited in this regard.

In the example of FIG. 6, the process (600) begins at (602) and proceeds to block (604) where a node activates a discontinuous reception mode. Alternatively, the node is already in a discontinuous reception mode. Upon activation of a discontinuous reception mode, a node determines a quality of a link currently in use. In various embodiments, the quality of the link can be determined periodically by the node, or alternatively, the quality of the link may be determined based upon the occurrence of an event.

At block (606), the node monitors a link of the wireless communication network. While monitoring the link, the node receives one or more frames corresponding to a transmission. Based upon the received frames, a synchronizer of the node generates one or more synchronization signals at block (608). The synchronization signals can be generated for each received frame, or alternatively, more or fewer synchronization signals may be generated for a plurality of frames. In various embodiments, a determination of whether to generate an in-synch synchronization signal or an out-of-synch synchronization signal is based upon a signal-to-noise ratio of the received frame. Other methods of classifying a received frame may also be utilized.

At block (610), the controller of the node determines the quality of the link. In various embodiments, the controller monitors one or more counters to determine if a predetermined number of in-synch or a predetermined number of out-of-synch signals has been generated and received. In response to receipt of a predetermined number of in-synch signals, the node classifies the link as being in good condition. In response to receiving a predetermined number of consecutive out-of-synch signals, the controller may classifies the link as a failed link.

In one embodiment, the node determines the quality of the link using a table or data structure including predetermined criteria for a plurality of discontinuous reception cycles, wherein the discontinuous reception cycles are differentiated from one another based upon a discontinuous cycle coefficient. The discontinuous reception cycle can correspond to a DRX cycle coefficient (302). Based on the DRX cycle coefficient, the node utilizes predetermined criteria for counters in Layer three, e.g., Y0 310 and Z0 310. These values correspond to the number of consecutive synchronization signals required to classify the link as stable or unstable. In one embodiment, N313 (304) corresponds to a number of out-of-synch signals required to classify the link as a failed link, and N315 (306) corresponds to a number of in-synch signals required to classify the link as being in good condition. As the DRX cycle coefficient changes, the numbers associated with the filters also change.

Figure 3:
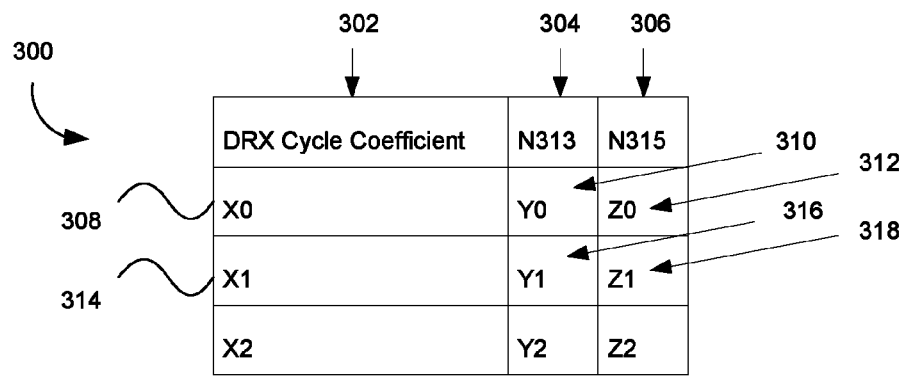
FIGS. 3-4 illustrate tables that may be used to facilitate radio link monitoring.

In another embodiment, the filters (e.g. N313, and N315) are configured to indicate that a specified number of synchronization signals have been received, the specified number statically determined by a specification, for example the 3GPP specification. In this embodiment, the period of time to monitor the signals can be altered to effectuate appropriate averaging. For example, a controller may utilize data stored in memory, for example the table of FIG. 4, to determine a measurement period that corresponds to a given DRX cycle coefficient. For example, given that the current specification for 3GPP monitors a link for two hundred milliseconds, a DRX cycle in which the discontinuous period is half the two hundred milliseconds has a measurement period that is four hundred milliseconds. This ensures that the node is active and monitoring the link for an effective measurement period equivalent to current standards. As the DRX cycle varies, a coefficient also varies, thereby indicating an appropriate measurement period. In various embodiments, the data stored in the data structures of FIGS. 3 and 4 is determined and defined through simulations and field testing. The process (600) may then end at block (612).

Although certain embodiments have been illustrated and described herein, a wide variety of alternate and/or equivalent embodiments or implementations calculated to achieve the same purposes may be substituted for the embodiments shown and described without departing from the scope of the claims below. This application is intended to cover any adaptations or variations of the embodiments discussed herein.

What is claimed is:
1. A method, comprising:
monitoring a link of a wireless communication network for a period of time during a plurality of active periods of a discontinuous reception cycle, wherein the discontinuous reception cycle corresponds to a discontinuous reception (DRX) cycle coefficient;
based on the DRX cycle coefficient, determining a first number;
during the plurality of active periods of the discontinuous reception cycle, generating synchronization signals by
generating an in-synch signal in response to receipt of one or more frames having a signal-to-noise ratio above a predetermined threshold;
based on the synchronization signals including a number of consecutive in-synch signals that is at least as high as the first number, determining that the link is in a working condition, wherein the first number is greater than one; and
based on a change in the DRX cycle coefficient, updating the first number.
2. The method of claim 1, further comprising:
determining the period of time by accessing a lookup table, wherein the lookup table includes one or more periods of time related to one or more discontinuous reception cycles.
3. The method of claim 1, wherein generating the synchronization signals further comprises generating an out-of-synch signal in response to receipt of one or more frames having a signal-to-noise ratio below the predetermined threshold.
4. The method of claim 3, further comprising:
based on the DRX cycle coefficient, determining a second number; and
determining that the link has failed based on the synchronization signals including the second number of consecutive out-of-synch signals, wherein the second number is greater than one.
5. The method of claim 1, wherein the monitoring is performed periodically.
6. The method of claim 1, wherein the duration of the period of time is determined such that a combined duration of the plurality of active periods is at least as large as a predetermined threshold.
7. The method of claim 1, wherein a duration of the period of time is determined based on a duration of the plurality of active periods of the discontinuous reception cycle.

8. The method of claim 1, wherein each of the synchronization signals corresponds to a status of the link.

9. The method of claim 1, further comprising:
based on the DRX cycle coefficient, determining the period of time.

10. The method of claim 1, wherein a duration of individual active period of the plurality of active periods is based on the DRX cycle coefficient.

11. An article of manufacture comprising a plurality of programming instructions stored on a non-transitory computer-readable medium that, when executed, enable a node within a wireless communication network to:
monitor a link of the wireless communication network for a period of time during a plurality of active periods of a discontinuous reception cycle, wherein the discontinuous reception cycle corresponds to a discontinuous reception (DRX) cycle coefficient;
based on the DRX cycle coefficient, determine a first number;
generate synchronization signals during the plurality of active periods by generating an in-synch signal in response to receipt of one or more frames having a signal-to-noise ratio above a predetermined threshold, wherein each of the synchronization signals corresponds to a status of the link;
based on the synchronization signals, determine a quality of the link, wherein determining the quality of the link comprises
based on the synchronization signals including a number of consecutive in-synch signals that is at least as high as the first number, determining that the link is in a working condition, wherein the first number is greater than one; and
based on a change in the DRX cycle coefficient, update the first number.

12. The article of manufacture of claim 11, wherein the plurality of programming instructions, when executed, further enable the node to determine the period of time based on the discontinuous reception cycle.

13. The article of manufacture of claim 11, wherein the plurality of programming instructions, when executed, further enable the node to calculate the time period based on a duration of the plurality of active periods of the discontinuous reception cycle.

14. The article of manufacture of claim 11, wherein the plurality of programming instructions, when executed, further enable the node to access a lookup table to determine the period of time, wherein the lookup table includes one or more periods of time related to one or more discontinuous reception cycles.

15. The article of manufacture of claim 11, wherein:
the plurality of programming instructions, when executed, enable the node to determine that the link has failed based on the synchronization signals including a number of consecutive out-of-synch signals;
the second number is greater than one; and
the second number is based at least in part on the DRX cycle coefficient.

16. An apparatus comprising:
a transceiver configured to monitor a link of a wireless communication network for a period of time during active periods of a discontinuous reception cycle, wherein the discontinuous reception cycle corresponds to a discontinuous reception (DRX) cycle coefficient;
a synchronizer coupled to the transceiver, wherein the synchronizer is configured to generate synchronization signals during the plurality of active periods, wherein each of the synchronization signals corresponds to a status of the link; and
a controller coupled to the synchronizer, wherein the controller is configured to (i) based on the DRX cycle coefficient, determining a first number, (ii) determine a quality of the link based on the synchronization signals, and (iii) based on a change in the DRX cycle coefficient, update the first number,
wherein the controller is further configured to determine, based on the synchronization signals including a number of consecutive out-of-synch signals that is at least as high as the first number, that the link has failed, and wherein the first number is greater than one.

17. The apparatus of claim 16, wherein the controller is further configured to determine the duration of time based on the discontinuous reception cycle.

18. The apparatus of claim 16, wherein the controller is further configured to calculate the time period based on a duration of the plurality of active periods of the discontinuous reception cycle.

19. The apparatus of claim 16, wherein:
the controller is further configured to determine, based on the synchronization signals including a second number of consecutive in-synch signals, that the link is in a working condition;
the second number is greater than one; and
the second number is based at least in part on the DRX cycle coefficient.

20. The apparatus of claim 16, wherein the transceiver is further configured to generate (i) in-synch signals in response to receipt of one or more frames having a signal-to-noise ratio above a predetermined threshold, or (ii) out-of-synch signals in response to receipt of one or more frames having a signal-to-noise ratio below the predetermined threshold.

21. A method, comprising:
monitoring a link of a wireless communication network for a period of time during a plurality of active periods of a discontinuous reception cycle, wherein the discontinuous reception cycle corresponds to a discontinuous reception (DRX) cycle coefficient;
based on the DRX cycle coefficient, determining a first number;
during the plurality of active periods of the discontinuous reception cycle, generating synchronization signals by generating an in-synch signal in response to receipt of one or more frames having a signal-to-noise ratio above a predetermined threshold;
based on the synchronization signals including a number of consecutive in-synch signals that is at least as high as the first number, determining that the link is in a working condition, wherein the first number is greater than one; and
based on the DRX cycle coefficient, determining the period of time, wherein the DRX cycle coefficient is a first DRX cycle coefficient, and wherein determining the period of time further comprises
accessing a lookup table, wherein the lookup table maps each DRX cycle coefficient of a plurality of DRX cycle coefficients to a corresponding value of a plurality of values,
based on the first DRX cycle coefficient corresponding to the discontinuous reception cycle, accessing a first value that is mapped by the lookup table to the first DRX cycle coefficient, and
based on the first value, determining the period of time.

22. A method, comprising:
monitoring a link of a wireless communication network for a period of time during a plurality of active periods of a discontinuous reception cycle, wherein the discontinuous reception cycle corresponds to a discontinuous reception (DRX) cycle coefficient;
based on the DRX cycle coefficient, determining a first number;
during the plurality of active periods of the discontinuous reception cycle, generating synchronization signals by
  generating an in-synch signal in response to receipt of one or more frames having a signal-to-noise ratio above a predetermined threshold; and
based on the synchronization signals including a number of consecutive in-synch signals that is at least as high as the first number, determining that the link is in a working condition, wherein the first number is greater than one,
wherein determining the first number further comprises
  accessing a lookup table, wherein the lookup table maps each DRX cycle coefficient of a plurality of DRX cycle coefficients to a corresponding number of a plurality of numbers, wherein each number of the plurality of numbers represent a number of consecutive in-synch signals for determining that the link is in a working condition while the discontinuous reception cycle corresponds to a corresponding DRX cycle coefficient of the plurality of DRX cycle coefficients, and
  based on the DRX cycle coefficient being mapped to the first number of the plurality of numbers in the lookup table, determining the first number.

* * * * *